Patented Oct. 1, 1935

2,016,202

UNITED STATES PATENT OFFICE 2,016,202

POLYVINYL RESINOUS COMPOSITION AND PROCESS OF MAKING SAME

Ernest P. Irany, Shawinigan Falls, Quebec, Canada, assignor to Shawinigan Chemicals Limited, Montreal, Quebec, Canada, a corporation of Canada No Drawing. Application January 9, 1933, Serial No. 650,864

3 Claims. (Cl. 106—22)

This invention relates to improvements in thermoplastic compositions and articles made therefrom in which the principal thermoplastic ingredient is a polyvinyl resin.

The pronounced plasticity of vinyl ester polymers and of the reaction products of vinyl esters with aldehydes is a disadvantage for certain industrial or commercial uses of these bodies. The same applies, though in lesser degree, to the resins obtained by partially or completely hydrolyzing these bodies and condensing the hydrolysis products with an aldehyde.

Certain natural resins commonly designated as varnish gums, for example, rosin, damar or copal, have been proposed as modifying additions to polyvinyl resins to improve the water resistance of the polyvinyl bodies and particularly polyvinyl esters and reaction products of vinyl esters and aldehydes, which are noticeably water absorbent.

It has been discovered that certain natural gums of vegetable origin, which may be defined as exudations from plants of the species Xanthorrhœa (hastilis, Australis, etc.) belonging to the order Asphodeleæ, and are generally known in commerce under various names such as acaroid gum or yacca gum, and sometimes as Black Boy gum or Botany Bay gum or earth shellac, contain an active principle which has the effect of stiffening the aforesaid polyvinyl resins and of increasing their water resistance. These gums, which will be hereinafter referred to by the term "yacca gum", are not varnish gums in the accepted sense of the term and are of a different chemical nature.

The aforesaid stiffening effect or form stabilizing effect is obtained without affecting the plasticity of the resins at working temperatures and without materially increasing the softening points of the resins. The effect of these gums, their extracts or concentrates, is not comparable to that produced by fillers and cannot be duplicated by fillers. Fillers can contribute little to form-stability unless used in quantities approaching the maximum that can be incorporated (packing limit) and their effect is not form-stabilization of the resin itself, but a resistance against deformation through interlocking of their own particles. These amounts necessarily interfere with working plasticity and all physical properties of the compound, and are of the order of at least ten times the amount of the aforesaid yacca gum to produce the same form-stability.

The term "form-stability" is herein used to indicate a reduction of permanent and plastic warping or deformation at temperatures at or slightly above ordinary atmospheric temperatures as well as cold flow and elastic memory.

According to the present invention, yacca gum, or an extract or concentrate thereof, is combined with polyvinyl resins, particularly polyvinyl esters, in presence or absence of further resinous, plastic or plasticizing admixtures, dyestuffs and the like and in the presence or absence of fillers, fibres, pigments, abrasives and the like.

The amount of yacca gum or extract or concentrate thereof used may be between 5% and 100% or more of the weight of the polyvinyl resin.

Mixing of the polyvinyl esters and yacca gum may be effected by rolling or kneading the two at temperatures of plasticity or semi-fluidity or by means of a common solvent, for example, butyl or ethyl acetate, ethyl alcohol or acetone.

The yacca gum may be used in its natural state or may be first subjected to physical or chemical purification, according to the following methods or according to any other suitable method.

Method A

Crude yacca gum is dissolved in alcohol, ethyl acetate or other suitable solvent, filtered, steam distilled and vacuum-dried. Concentration of the product by extraction of indifferent matter with suitable solvents may or may not follow or precede the purification.

Method B

Commercial yacca gum is dissolved in aqueous caustic soda solution of about 3% strength, filtered, and precipitated by the addition of dilute sulphuric acid.

Method C

The product obtained by Method B is extracted with chloroform, and the extract collected.

While the product of the above methods of chemical purification may not be, strictly speaking, the original gum, the essential fact is that such a purification product has form-stabilizing effect the same as or better than the unpurified gum.

The following examples, in which the parts are by weight, are illustrative of practice of the invention, but it will be understood the invention is not limited to the materials, proportions or methods of treatment.

Example I

A homogeneous mixture of 80 parts of polyvinyl acetate, having a viscosity of 20 centipoises, and 20 parts purified yacca gum is prepared on steam heated mixing rolls or in a steam jacketed kneading machine of conventional design a sufficient temperature to keep the whole mass in semi-fluid or plastic condition.

Similar test pieces of the polyvinyl acetate alone, of the above mixture and of a similar mixture in which gum copal is substituted for the yacca gum, show the following:—

|  | Warping (8 hours) | Softening point | Water absorption |
|---|---|---|---|
| Polyvinyl acetate | Infinite | 143 | 4.68 |
| Polyvinyl acetate and yacca | 0.06 | 139 | 2.75 |
| Polyvinyl acetate and copal | 3.70 | 118 | 2.30 |

From the foregoing it will be seen that yacca gum stiffens the polyvinyl acetate to a much greater extent then even fossil copal, one of the most form-stable and highest melting varnish gums; and that yacca gum decreases the water absorption almost as much as copal, but does not lower the softening point appreciably while copal effects a serious and undesirable lowering of the softening point.

Example II

A mixture of 64 parts polyvinyl acetate, having viscosity of 20 centipoises, 32 parts purified yacca gum and 4 parts carnauba wax is prepared as in Example I.

A comparison of the mixture with one omitting yacca gum shows:—

|  | Warping (30 min.) | Softening point | Water absorption |
|---|---|---|---|
| Polymer and wax | 6.5 | 128.5 | 3.52 |
| Polymer, wax and yacca gum | 0.02 | 132 | 2.72 |

From these comparative tests it will be seen yacca gum greatly increases warping resistance and reduces water absorption.

Example III

A mixture of 75 parts polyvinyl acetate, 20 parts yacca gum and 5 parts refined Montan wax is prepared by solution separately or together in ethyl acetate or other common solvent or mixture of solvents, steam distillation and vacuum drying. Comparative tests similar to those of Example II show similar results.

Example IV

A mixture of 70 parts polyvinyl resin with softening point of 171° C. (prepared as described in application Ser. No. 349,894 by aldehyde condensation of 70% hydrolyzed polyvinyl acetate of 15 centipoises viscosity), 20 parts yacca gum, 10 parts dibutyl phthalate and 5 parts refined Montan wax is prepared as described in either of Examples I or III. Comparison of the above mixture with similar mixtures, one omitting yacca gum and one substituting rosin for yacca gum shows:—

|  | Warping (8 hours) | Softening point | Water absorption |
|---|---|---|---|
| Mixture | 0.32 | 151 | 2.08 |
| Mixture omitting yacca gum | 0.72 | 142 | 2.25 |
| Mixture substituting rosin for yacca | 2.4 | 125.5 | 1.62 |

Example V

To 100 parts of the mixture of Example II, add 170 parts powdered limestone and 30 parts sulphite wood pulp. Comparative tests show that the yacca gum decreases warping and water absorption.

Example VI

A mixture of 32.5 parts of polyvinyl resin as in Example IV, 50 parts polyvinyl acetate as in Example I, 15 parts yacca gum, 2.5 parts carnauba wax, 125 parts brick powder, 15 parts bone black and 10 parts carbon black is prepared. Comparative tests show that this mixture has greater warping resistance and greater water resistance than a similar mixture omitting yacca gum.

Example VII

A mixture of 70 parts polyvinyl resin with softening point between 120° C. and 150° C. prepared as described in application Ser. No. 349,894 by aldehyde condensation of 30% hydrolyzed polyvinyl acetate having viscosity between 6 and 15 centipoises), 20 parts yacca gum, 10 parts dibutyl phthalate and 5 parts refined Montan wax, is prepared as described in either of Examples I or III. The mixture has satisfactory form-stability for many purposes but without the yacca gum is materially less form-stable.

In the following claims, the term "polyvinyl resin" is to be understood as indicating both polyvinyl esters and aldehyde condensations of partially hydrolyzed polyvinyl esters.

Yacca gum may be admixed with polyvinyl esters other than polyvinyl acetate, for example polyvinyl butyrate, with results similar to those hereinbefore described.

Having thus described my invention, what I claim is:—

1. A composition of matter comprising a polyvinyl resin and yacca gum as a form stabilizer for the resin, the said resin being an aldehyde condensation of a partially hydrolyzed polyvinyl ester, the said composition having form-stability materially greater than that of the polyvinyl resin contained therein.

2. A process of increasing the form-stability and water resistance of a polyvinyl resin being an aldehyde condensation of a partially hydrolyzed vinyl ester polymer, which comprises mixing the resin with yacca gum.

3. A moulded product comprising an aldehyde condensation product of a partially hydrolyzed vinyl ester polymer and yacca gum as a form stabilizer for said condensation product, the said product having form-stability materially greater than that of the aldehyde condensation product contained therein.

ERNEST P. IRANY.